United States Patent [19]
Blackshire et al.

[11] Patent Number: 6,106,008
[45] Date of Patent: *Aug. 22, 2000

[54] HYBRID AIRBAG INFLATOR

[75] Inventors: Robert D. Blackshire, Glendale; Milan L. Storch, Tempe; Clyde L. Jones, Laveen, all of Ariz.

[73] Assignee: Ad Astram Scientific LLC, Tempe, Ariz.

[ * ] Notice: This patent is subject to a terminal disclaimer.

[21] Appl. No.: 08/685,231

[22] Filed: Jul. 23, 1996

Related U.S. Application Data

[63] Continuation-in-part of application No. 08/259,617, Jun. 14, 1994, Pat. No. 5,538,278.

[51] Int. Cl.⁷ ................................................... B60R 21/26
[52] U.S. Cl. ............................................ 280/737; 280/736
[58] Field of Search ................................ 280/736, 737, 280/741, 742; 102/266, 269, 271, 276, 277.1

[56] References Cited

U.S. PATENT DOCUMENTS

| | | | |
|---|---|---|---|
| 2,400,103 | 5/1946 | Cobb | 102/28 |
| 5,031,932 | 7/1991 | Frantom et al. | 280/737 |
| 5,131,680 | 7/1992 | Coultas et al. | 280/737 |
| 5,242,194 | 9/1993 | Popek | 280/737 |
| 5,538,278 | 7/1996 | Blackshire et al. | 280/737 |

OTHER PUBLICATIONS

Ellern, Herbert. Military and Civilian Pyrotechnics, Chemical Publishing Company, Inc. pp. 197–215; 397, 1968.

*Primary Examiner*—Paul N. Dickson
*Attorney, Agent, or Firm*—John D. Titus

[57] ABSTRACT

An improved hybrid airbag inflator comprises a container for storing a compressed gas having a rupturable wall defining an exit opening. A pyrotechnic gas generator has an output directed into the container for adding heat and mass flow to the compressed gas in the container. A single initiator ruptures the rupturable wall and initiates the gas generator, preferably via a pyrotechnic delay train which initiates combustion of the gas generator after a predetermined delay, to provide for delayed onset of the high pressure gas generator input. The initiator is preferably an electric detonator that produces a self forging fragment to rupture the rupturable wall and initiate the pyrotechnic delay. The pyrotechnic generator may also have a second output directed into a manifold leading from the container to the airbag and entering the manifold downstream from the inlet nozzles that restrict the flow of compressed gas into the manifold.

14 Claims, 3 Drawing Sheets

6,106,008

HYBRID AIRBAG INFLATOR

This application is a continuation-in-part of Ser. No. 08/259,617 filed Jun. 14, 1994.

BACKGROUND OF THE INVENTION

This invention relates to an airbag inflator, specifically to an improved hybrid airbag inflator having a low mass initiator and an ignition delay sequencer to provide a controlled rate of inflation.

It is known in the art that for proper function of an inflatable vehicle occupant restraint (airbag), a controlled rate of inflation is critical. If the airbag inflates too rapidly, the occupant faces the potential of serious injury from the sudden deployment. If the airbag inflates too slowly, the airbag will fail to prevent the occupant from colliding with the vehicle dashboard, windshield or other rigid surface.

In a simple pyrotechnic inflator, some control over the inflation rate can be achieved by tailoring the quantity, shape and the burn rates of the gas generator propellant. In the pure stored cold gas inflator, some control over the inflation rate may be accomplished using variable or sequentially opened flow restrictions. This is typically accomplished by using eroding nozzles or some mechanism to change the nozzle geometry, sometimes with the undesirable side effect of having mechanisms that are subject to the effects of the acceleration present before and during the collision during which the inflator is intended to function.

A hybrid type inflator is an inflator that uses a combination of stored pressurized gas and a pyrotechnic gas generator to inflate the airbag. Typical of the prior art hybrid inflator are U.S. Pat. No. 5,242,194 to Popek and U.S. Pat. No. 3,895,821 to Schotthoefer et al. U.S. Pat. No. 5,242,194 to Popek discloses a hybrid inflator in which a hollow piston rod with an attached circular cutter is driven by a pyrotechnic actuator to puncture the seal disk. Subsequently, the flame from the actuator is conducted through the hollow piston rod to initiate the solid propellant gas generator to provide additional gas flow. U.S. Pat. No. 3,895,821 to Schotthoefer et al. discloses a hybrid airbag inflator in which a gas generator is ignited first, and thereafter the output of the gas generator ruptures a closure disk to release the pressurized gas. Gas flow control of the prior art devices is generally achieved by dimensional control of the nozzle, manifold, diffuser and other fluid flow controls, and by tailoring the quantity of propellant and its burn surface geometry.

It is known in the art that, in addition to controlling the overall inflation rate, a staged flow comprising an initial low inflation rate followed by a controlled high inflation rate is desirable to address protection of the out-of-position occupant, particularly a child standing on the vehicle seat. The low initial inflation rate allows the bag to break out of its container and assume a deployed configuration without injuring the vehicle occupant. The subsequent controlled high rate of inflation then provides the required energy absorption to prevent occupant injury.

The prior art discloses several methods addressing the problem of staged flow of gases in a hybrid inflator. U.S. Pat. No. 5,226,561 to Hamilton et al. discloses a hybrid inflator in which an initial explosive charge propels a projectile through a seal disk to release the cold gas. Subsequently, a spring/firing pin mechanism, which provides a short delay, actuates a gas generating means to supply the hot gas. U.S. Pat. No. 5,031,932 to Frantom, et al. discloses an inflator in which a first pyrotechnic actuator punctures a seal disk and, after a predetermined delay, provided by a remote timer, a second actuator initiates the pyrotechnic gas generator.

None of the prior art inflator, however, disclose an apparatus capable of providing an optimum delay between the onset of cold gas flow and the onset of the gas generator flow, without also having the added expense and complexity of multiple pyrotechnic initiators, or complex mechanisms that are subject to inertial effects during a collision. What is needed then is an airbag inflator that provides a staged gas flow without the complexity of the prior art multiple initiator or mechanical delay mechanism designs.

SUMMARY OF THE INVENTION

The improved airbag inflator of the present invention comprises an initiator having a non-conical liner at the output end, which is adapted to form an explosively formed penetrator. Preferably, the initiator has a hemispherical or semi-spherical liner adapted to form a rearward-folding self forging fragment. In response to an external signal, such as a signal from an impact sensor, the initiator detonates, causing the liner to collapse into a self forging fragment that is propelled through a rupture disk to initiate the flow of pressurized gas. The self forging fragment continues through the rupture disk and impinges an impact sensitive pyrotechnic material which, in turn, initiates a pyrotechnic gas generator. In a preferred embodiment, the self forging fragment impinges an impact sensitive pyrotechnic material, which initiates a pyrotechnic delay train. The pyrotechnic delay train then initiates the pyrotechnic gas generator after a predetermined delay. The self forging fragment initiator is insensitive to acceleration, yet it provides a reliable means of rupturing the rupture disk and initiating the pyrotechnic generator. Similarly, the pyrotechnic delay column provides the desirable delay between the initial low rate cold gas flow and the onset of the high rate gas generator flow, yet it accomplishes the delay function without the added cost and complexity of additional mechanical parts or additional initiators and appurtenant electronics necessary to implement an electronic delay.

BRIEF DESCRIPTION OF THE DRAWINGS

The above and other objects, aspects, features and attendant advantages of the present invention will become apparent from a consideration of the ensuing detailed description of presently preferred embodiments and methods thereof, taken in conjunction with the accompanying drawings, in which.

DESCRIPTION OF PREFERRED EMBODIMENTS AND METHODS

Figure 1:
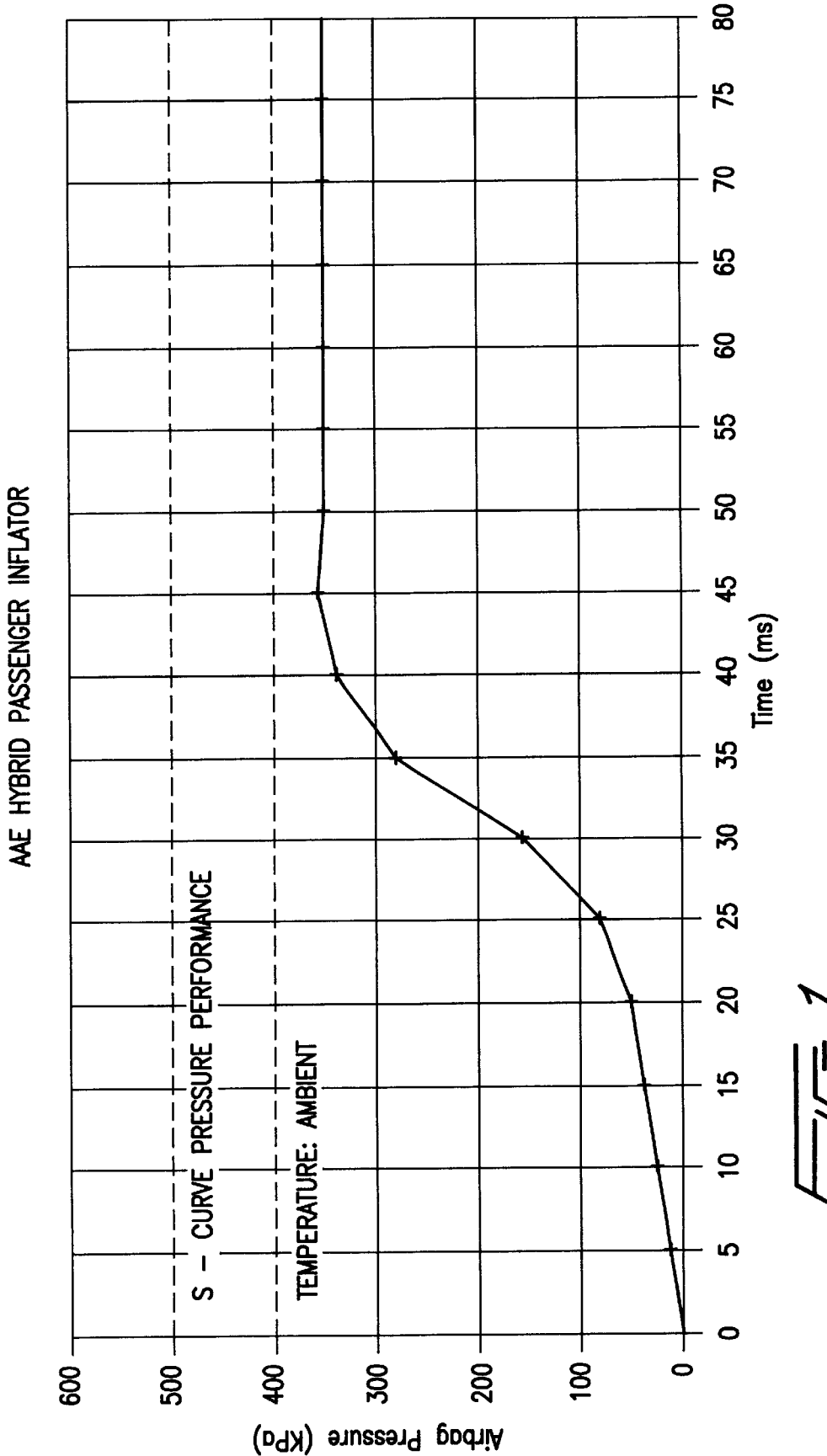
FIG. 1 is a graphical representation of an airbag deployment sequence.

The improved hybrid airbag inflator of the present invention comprises a low cost, compact, inflator capable of providing a tailored flow of gas for inflating an airbag. With reference to FIG. 1, a typical ideal airbag inflation sequence comprises an S-curve 100 of pressure with respect to time. Initially, the airbag inflation pressure increases from zero to about 16 psig in about 25 milliseconds. At about the 25 millisecond point, the slope of the inflation curve increases to about 2 psig per millisecond for about 15 milliseconds resulting in an inflation pressure of about 50 psig by 40 milliseconds after initiation. The airbag then maintains a constant inflation pressure of about 50 psig for an additional 40 milliseconds, after which the airbag deflates. The low inflation rate for the first 25 milliseconds after initiation allows the airbag to break out of its container and deploy to gently engage the passenger and assist in correcting the position of any out-of-position passenger. After the passenger has been engaged by the airbag, the 15 millisecond high inflation rate provides the pressure necessary to absorb the impact and protect the passenger. The exact pressure and time of the inflation sequence depends on the particular airbag/vehicle combination. For example, a low rate of inflation for 20 milliseconds followed by a high rate of inflation for 20 milliseconds may be appropriate in some circumstances, and a low rate of inflation for 40 milliseconds followed by a high rate for 20 milliseconds may be appropriate in others. In general, however, a low rate of initial inflation for breakout and passenger engagement followed by a high inflation rate energy absorbing stage is always desirable.

Figure 2:
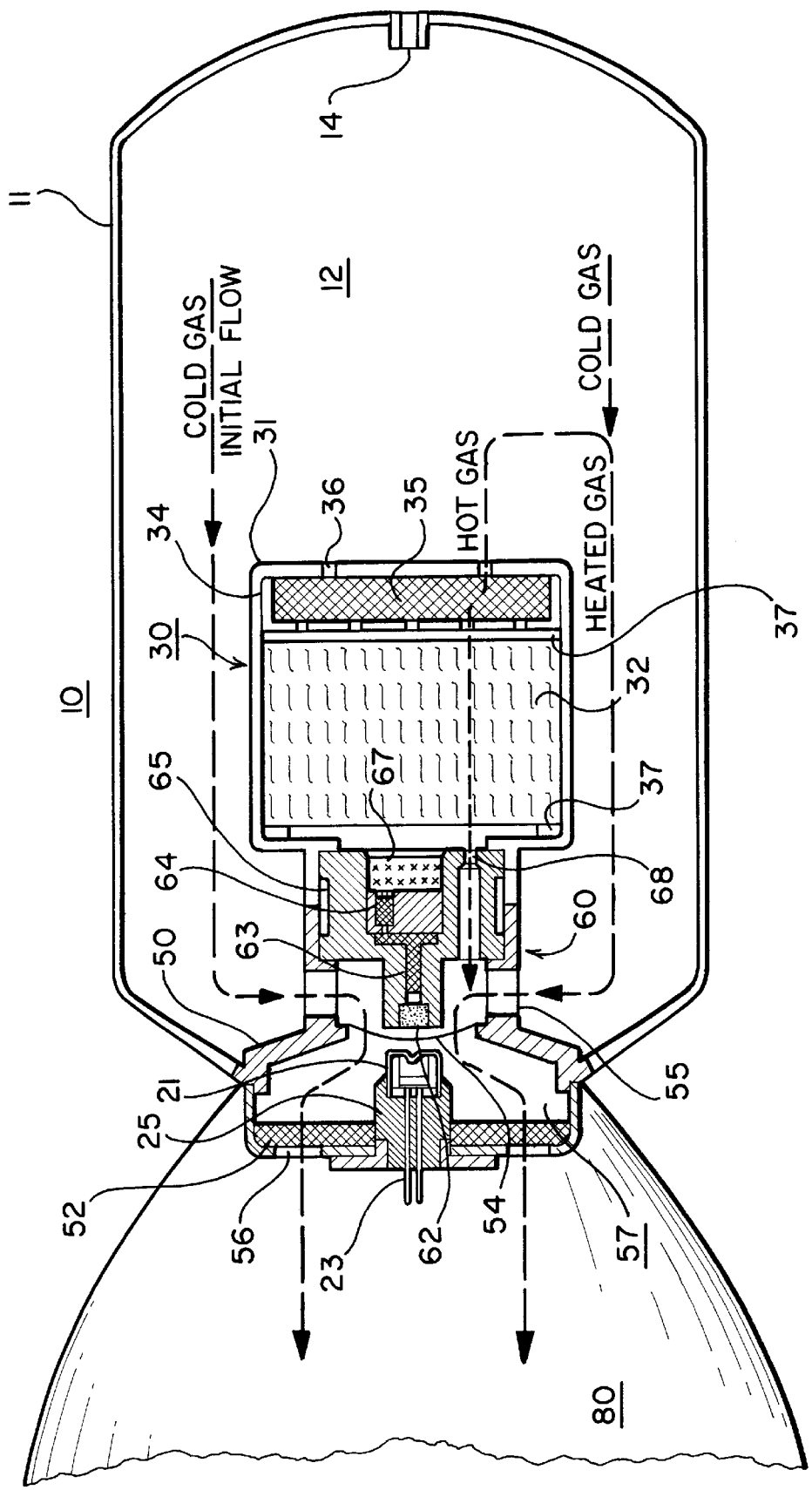
FIG. 2 is a sectional view of a hybrid inflation device of the present invention.

With reference to FIG. 2, according to a preferred embodiment, the inflator 10 has a gas container 11 of conventional construction which contains the cold gas 12 (preferably an inert gas such as argon or a mixture of argon and helium). A gas generator 30, which contains a combustible material 32, is preferably disposed within the container 11. An igniter assembly 60 is disposed adjacent the gas generator and is supported by housing 31 and the manifold 50. The igniter 60 comprises a housing 65 which contains a primer 62, a lead charge 63, a pyrotechnic delay column 64, and an output charge 67.

The manifold 50 provides a channel 57 for communication of the high pressure gas 12 through ports 56 to the airbag 80. A seal disk 54 is disposed in the channel 57 adjacent igniter 60 to prevents the flow of gases prior to function of the initiator 21. The seal disk 54 is preferably a prestressed metal material configured to contain the high pressure gas 12.

Figure 5:
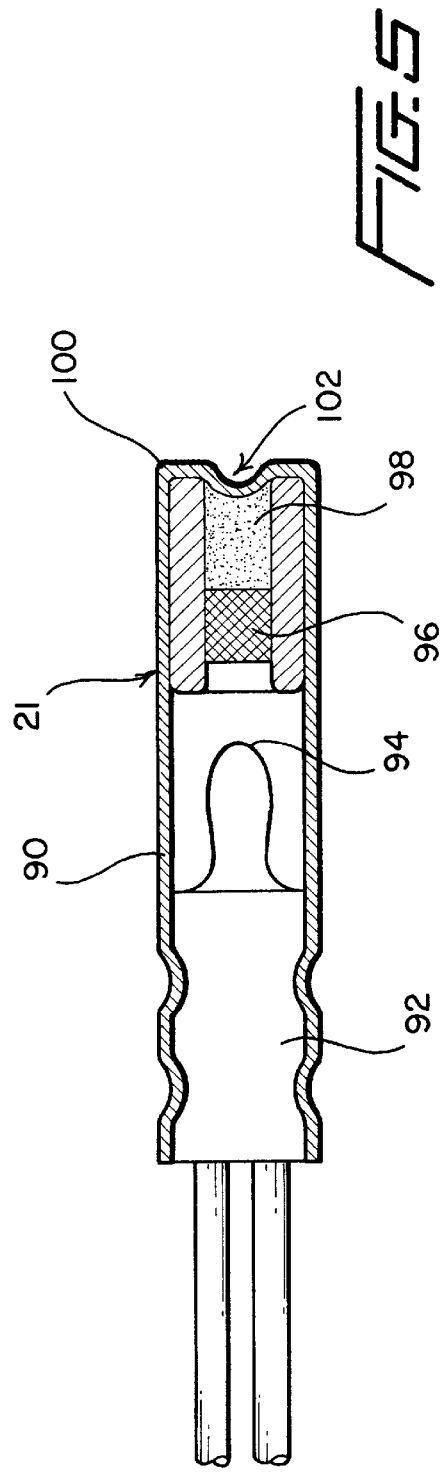
FIG. 5 is a sectional view of an initiator according to a preferred embodiment of the present invention.

With reference to FIG. 5, the initiator 21 comprises an electro-explosive detonator of substantially conventional construction, with the exception that the output end has a liner which is adapted to form an explosively formed penetrator. Preferably, the initiator has a hemispherical or semi-spherical liner adapted to form a rearward-folding self forging fragment. The initiator 21 comprises an outer housing 90, which is preferably cylindrical, and which contains a conventional bridgewire header 92, spot charge 94, intermediate charge 96 and output charge 98. In a preferred embodiment, the spot charge 94 comprises a mixture of zirconium or titanium with potassium perchlorate, or boron with calcium chromate. The intermediate charge 96 is preferably lead azide or similar primary explosive, and the output charge 98 is preferably PETN, HMX, RDX or other similar secondary explosive. The housing 90 includes a liner 100 comprising a copper foil with a hemispherical or semi-spherical indentation 102. The foil liner preferably has a thickness of from 6 to 15 percent of the diameter of the output-charge (ie. charge diameters). The radius of the indentation is preferably from 0.3 to 0.5 charge diameters and most preferably about 0.5 charge diameters, with a depth of 0.3 to 0.5 charge diameters and most preferably about 0.5 charge diameters. Thus, for a housing having an output charge 3 millimeters in diameter, the radius of the indentation is preferably about 1.0 to 1.6 millimeters and the depth of the indentation about 1.2 millimeters.

With reference to FIG. 1, the initiator 21 is disposed adjacent the seal disk 54 with its output end pointed such that upon function of the initiator 21, the fragment formed by the detonation will puncture seal disk 54 and strike the primer 62 of igniter 60. Preferably the output end of the initiator is spaced from 0.3 to 1.0 charge diameters from the seal disk 54, to provide sufficient distance for the fragment to form before striking the seal disk 54 (i.e. standoff distance). In a preferred embodiment having an output charge 3 millimeters in diameter, a spacing of 1.5 millimeters from the seal disk is an optimal compromise between standoff distance and size restrictions for the inflator assembly.

After the initiator is detonated to rupture the seal disk 54, channel 57 in the manifold 50 is opened to the stored gas 12 in container 11. Stored gas 12 begins to flow into the interior of the airbag 80 through manifold 50. The pressurized stored gas provides a significant fraction of the total gases required to fully inflate the airbag 80, and may range in pressure from 2000 psig to 5000 psig.

After the fragment formed by igniter 21 punctures the seal disk, 54, it continues past the ruptured seal disk and strikes the primer 62 of igniter 60. The shock from the impact ignites the impact sensitive pyrotechnic material contained in primer 62. The primer 62 then ignites lead charge 63. The combustion of the lead charge 63 then ignites the pyrotechnic delay column 64 which burns for a predetermined time and then ignites the output charge 67, which in turn, ignites the combustible material 32 of the gas generator 30. The hot combustion products from the gas generator 30 flow through the grain trap 34, the filter 35, and the nozzles 36. The hot combustion gases mix with the cold gas 12 as they flow though the container 11, then through the nozzles 55 to communicate with the channel 57. The mixed gases continue to flow through the filter 52 and the ports 56 to fully inflate the airbag 80 to protect the vehicle occupant during the vehicle impact.

Figure 4:
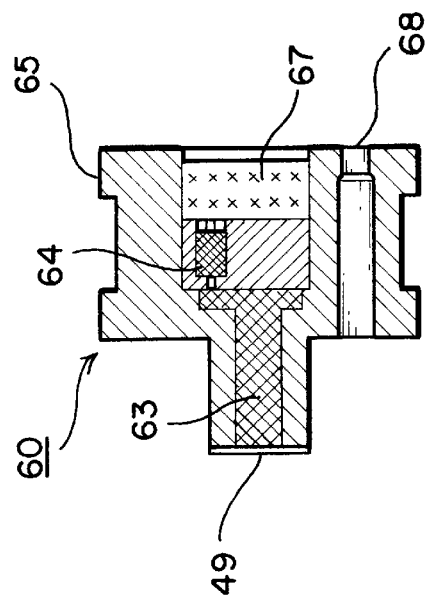
FIG. 4 is a sectional view showing a pyrotechnic delay train according to a second embodiment of the present invention.
Figure 3:
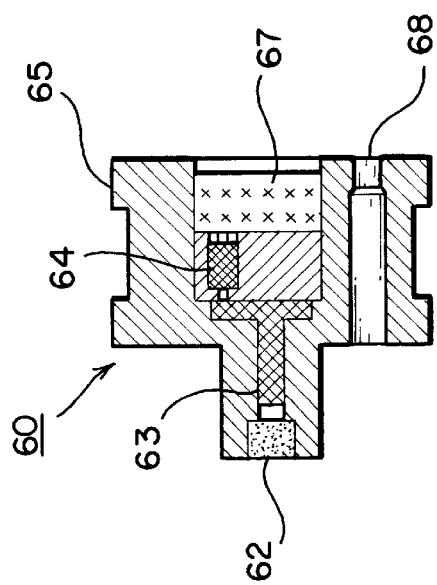
FIG. 3 is a sectional view showing a pyrotechnic delay train according to a first embodiment of the present invention.

With reference to FIG. 3, the delay column 64, which delays the ignition of the pyrotechnic gas generator, is preferably of conventional construction using well characterized pyrotechnic materials such as boron mixed with calcium chromate or boron mixed with lead oxide or similar materials having a conflagration velocity of from 1 to 50 inches per second, preferably from 5 to 20 inches per second, such that a delay of from 5 to 50 milliseconds can be accommodated in a reasonable volume within the airbag inflator apparatus. The primer 62 may be zirconium potassium perchorate or similar shock and heat sensitive explosive. The lead charge 63 and the output charge 67 are preferably zirconium or titanium mixed with potassium perchlorate. In an alternative embodiment shown in FIG. 4, the primer 62 is eliminated in favor of direct initiation of the lead charge 63 by the highly energetic impact of the self forging fragment. The lead charge 63 is retained in place by a closure disk 49. The housing 65 of igniter 60 also includes a bypass opening 68, which opens between manifold 50 and the housing 31 of gas generator 30. The function of bypass opening 68 is explained more fully below.

The gas generator 30 is joined by a conventional MiG welding or other conventional metal fusion process to the manifold 50 thereby retaining the igniter 60 between the gas generator 30 and the manifold 50. The combination of the manifold 50 and the gas generator 30 is joined to the container 11 of the inflation device 10 by a conventional MiG welding or other conventional metal fusion process. The joining of the container 1, the gas generator 30, the manifold 50 with the seal disk 54, and the fill port 14 provide an hermetic seal to prevent leakage of the stored gas 12 from the inflation device 10.

The delay time provided by the pyrotechnic delay column 64 enables the initial staged flow of cold gas into the airbag 80 to produce the initial low flow rate desired for breakout and initial slow expansion of the airbag 80. Once the gas generator is ignited, the flow of hot gases through the bypass opening 68 adds mass flow and heat to the cold gas and thereby provides an immediate increase in the total mass flow rate of gases through the channel 57 without changing the physical size of the inlet nozzles 55. At the same time, at the opposite end of the gas generator, the hot combustion products of the gas generator passing through the nozzles 36 mix with the cold gases in the container 11 and provide an increase in pressure in the container 11, thereby causing increased flow through the ports 55 into the manifold 50 and into airbag 80. The hot gases continue flowing from the gas generator 30 through bypass nozzle 68 and also through the nozzles 36 continue to mix with and heat the cold gas in the container 11 to sustain and complete the staged inflation of the airbag 80. The volume of the stored inert gas and its pressure are determined by the type and size of vehicle in which the inflator is disposed. The quantity of the combustible gas generating material and its geometric configuration are likewise determined.

When a vehicle equipped with an inflator according a preferred embodiment the present invention is involved in a collision, an impact sensor detects the impact and sends signal to the initiator. The initiator functions to produce a self forging fragment which penetrates the seal disk. The high pressure of the stored gas causes the punctured seal disk to rupture completely, allowing the cold gas to flow though the manifold into interior of the bag. At substantially the same instance, the self forging fragment strikes the primer of the igniter. The primer initiates the igniter lead charge which, in turn, ignites the pyrotechnic delay column. The delay column then burns for a predetermined period of time after which it ignites the output charge, which, in turn, ignites the gas generator. Thus, the stored cold gas is allowed to flow for a predetermined time prior to the ignition of the combustible material in the gas generator. The desired time delay for the pyrotechnic delay column is variable and depends upon the size of the vehicle in which the inflation device is disposed and the volume of the bag and time required for its full inflation. After ignition of the gas generator, the hot gases generated by the combustible material in the gas generator mix with the cold gas in the cold gas container. Simultaneously, a portion of the gas generator output is directed into the manifold to provide further enhanced gas flow to augment the full inflation of the airbag.

Although certain preferred embodiments and methods have been disclosed herein, it will be apparent from the foregoing disclosure to those skilled in the art that variations and modifications of such embodiments and methods may be made without departing from the true spirit and scope of the invention. Accordingly, it is intended that the invention shall be limited only to the extent required by the appended claims and the rules and principles of applicable law.

What is claimed is:

1. An apparatus for inflating an inflatable vehicle occupant restraint comprising:

a container for storing a compressed gas, said container including a rupturable wall which is rupturable to define a gas exit opening in fluid communication with said inflatable vehicle occupant restraint;

a pyrotechnic gas generator having a combustion gas outlet directed into said compressed gas container for mixing a gas output of said pyrotechnic gas generator with said compressed gas;

a pyrotechnic delay train having an input end and an output end, said output end adapted to initiate combustion of said pyrotechnic gas generator at a predetermined period after initiation of said input end; and an initiator for rupturing said rupturable wall and for initiating said input end of said pyrotechnic delay train, whereby said compressed gas begins to flow substantially immediately after said rupturable seal is ruptured and said pyrotechnic gas generator begins to produce said gas output after a predetermined delay.

2. The apparatus of claim 1 wherein said predetermined delay is from 5 to 50 milliseconds.

3. The apparatus of claim 1 wherein said predetermined delay is from 10 to 40 milliseconds.

4. The apparatus of claim 1 wherein said predetermined delay is from 20 to 30 milliseconds.

5. The apparatus of claim 1 wherein said delay column comprises a combustible material having a conflagration rate of from 1 to 50 inches per second.

6. The apparatus of claim 1 wherein said delay column comprises a combustible material having a conflagration rate of from 5 to 20 inches per second.

7. The apparatus of claim 1 wherein said initiator comprises a pyrotechnic primer capable of producing a self forging fragment for rupturing said rupturable wall and initiating said pyrotechnic delay train.

8. The apparatus of claim 1 wherein said initiator comprises a pyrotechnic primer having an output end, said output end including a liner having a hemispherical depression therein.

9. The apparatus of claim 1 wherein said initiator comprises a pyrotechnic primer having an output end, said output end including a liner having semi-spherical depression therein.

10. A method for inflating an inflatable vehicle occupant restraint comprising:

rupturing a seal to release a compressed gas from a container into a manifold in fluid communication with said vehicle occupant restraint;

initiating a pyrotechnic delay train having a delay of from 5–50 ms;

initiating, with an output of said pyrotechnic delay train, a pyrotechnic gas generator for producing combustion gas upon initiation; and outputting said combustion gas through a gas output in said pyrotechnic gas generator for mixing with said compressed gas in said container.

11. An apparatus for inflating an inflatable vehicle occupant restraint comprising:

a container for storing a compressed gas, said container including a rupturable wall which is rupturable to define a gas exit opening in fluid communication with said inflatable vehicle occupant restraint;

a pyrotechnic gas generator having a combustion gas outlet directed into said compressed gas container for mixing a gas output of said pyrotechnic gas generator with said compressed gas;

a pyrotechnic ignition train having an input end and an output end, said output end adapted to initiate combustion of said pyrotechnic gas generator; and an initiator, which upon initiation ruptures said rupturable wall and initiates said input end of said pyrotechnic ignition train, said initiator comprising an elongate housing containing an ignitable material having an output end covered by a metallic liner, which forms a self forging fragment upon initiation of said ignitable material.

12. The apparatus of claim 11 wherein said metallic liner includes a substantially hemispherical depression therein.

13. The apparatus of claim 11 wherein said metallic liner includes a substantially semi-spherical depression therein.

14. The apparatus of claim 11 wherein said initiator comprises a cylindrical housing and said depression has a radius that is between 60% and 100% of said cylindrical housing radius.

* * * * *